US008863500B2

(12) United States Patent
Reinhold et al.

(10) Patent No.: US 8,863,500 B2
(45) Date of Patent: Oct. 21, 2014

(54) METHOD FOR OPERATING A METERING VALVE AND APPARATUS FOR IMPLEMENTING THE METHOD

(75) Inventors: Jens Reinhold, Backnang (DE); Marc Chaineux, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 934 days.

(21) Appl. No.: 12/212,438

(22) Filed: Sep. 17, 2008

(65) Prior Publication Data

US 2009/0077955 A1 Mar. 26, 2009

(30) Foreign Application Priority Data

Sep. 20, 2007 (DE) ........................ 10 2007 044 807

(51) Int. Cl.
*F01N 3/18* (2006.01)
*F01N 9/00* (2006.01)

(52) U.S. Cl.
CPC ............... *F01N 9/00* (2013.01); *F01N 2550/02* (2013.01); *F01N 2610/02* (2013.01); *F01N 3/18* (2013.01); *Y02T 10/47* (2013.01)
USPC ............................................... 60/295; 60/301

(58) Field of Classification Search
USPC .................... 60/286, 295, 301, 303; 123/490; 361/152
See application file for complete search history.

(56) References Cited

U.S. PATENT DOCUMENTS 6,587,248 B1 * 7/2003 Gyoten ......................... 359/245
2005/0146366 A1 * 7/2005 Steinschaden ................ 327/175
2005/0198943 A1 * 9/2005 Breuer et al. ................... 60/286
2007/0163232 A1 * 7/2007 Ueno .............................. 60/274
2009/0205316 A1 * 8/2009 Dougnier et al. ............... 60/274

FOREIGN PATENT DOCUMENTS

| | | |
|---|---|---|
| DE | 37 10 467 | 12/1987 |
| DE | 199 03 439 | 8/2000 |
| DE | 10 2006 044 080 | 3/2008 |
| EP | 1 024 254 | 8/2000 |

* cited by examiner

*Primary Examiner* — Kenneth Bomberg
*Assistant Examiner* — Jonathan Matthias
(74) *Attorney, Agent, or Firm* — Kenyon & Kenyon LLP

(57) ABSTRACT

A method for operating an electromagnetically actuated metering valve, which is loaded with a pulse-width modulated metering signal, which stipulates the dosage of a reagent or a precursor of the reagent introduced into the exhaust gas region of an internal combustion engine and an apparatus for implementing the method are proposed. A clock signal is provided, whose cycle duration is smaller than the cycle duration of the pulse-width modulated metering signal. The cycle duration of the pulse-width modulated metering signal is set as a function of a metering request signal to multiples of the cycle durations of the clock signal. The procedural approach according to the invention allows for a rapid adaptation of the dosage to the metering demands.

6 Claims, 2 Drawing Sheets

METHOD FOR OPERATING A METERING VALVE AND APPARATUS FOR IMPLEMENTING THE METHOD

TECHNICAL FIELD

The invention proceeds from a method for operating a metering valve, which meters a reagent or a precursor of a reagent into the exhaust gas region of an internal combustion engine and from an apparatus for implementing the method according to the class of the independent claims.

The subject matter of the invention at hand includes a computer program and a computer program product.

BACKGROUND

A method and an apparatus for operating an internal combustion engine, in whose exhaust gas region an SCR catalytic converter (Selective-Catalytic-Reduction) is disposed, are described in the German patent DE 199 03 439 A1. Said SCR catalytic converter reduces the nitrogen oxides contained in the exhaust gas of the internal combustion engine to nitrogen with a reagent.

Provision is, for example, made for the reducing agent ammonia to be the reagent. Said reducing agent can be extracted form a urea/water solution, respectively from a urea/formic acid/water solution as a precursor of the reagent. The dosage of the reagent or the precursor of the reagent must be carefully established. Too low of a dosage results in the nitrogen oxide no longer being able to be sufficiently reduced in the SCR catalytic converter. Too high of a dosage leads to a reagent slip, which can lead on the one hand to an unnecessarily high reagent consumption and on the other hand, depending on the properties of the reagent, to an unpleasant odor.

According to the European patent EP 1 024 254 A2, the determination of the reagent flow rate, respectively the metered amount of reagent, can take place based on an operating variable of the internal combustion engine, for example, the amount of fuel injected and/or the engine rotational speed and if need be at least one parameter of the exhaust gas, for example the exhaust gas temperature.

In the German patent DE 10 2006 044 080 A1, a method for operating a metering valve is described, which is implemented as an electromagenetically actuated valve. The metering valve is loaded with a pulse-width modulated metering signal, which defines the metering of a precursor of a reagent, which is to be introduced into the exhaust gas region of an internal combustion engine. The opening duration of the metering valve is limited to a minimum opening duration, for which the metering valve is opened completely and is set in such a way that a spray mist is always produced during the metering. In so doing, the reagent is prevented from crystallizing. The known method firstly ensures exact metering of the reagent and secondly counteracts clogging of the metering valve. The minimum opening duration depends on a plurality of variables, as, for example, the temperature and the operating voltage of the metering valve's electromagnet as well as the reagent pressure.

In the German patent DE 37 10 467 C1, a fuel injection valve is described, which contains a core surrounded by an electromagnet as well as an armature, which interacts with the core, which is fixedly connected to a valve needle. When the electromagnet is energized, the electromagnet attracts the armature and thereby unblocks an opening for the metering of the pressurized fuel up until the electromagnet is de-energized.

The task underlying the invention is to state a method for operating a metering valve, which meters a reagent or a precursor of the reagent into the exhaust gas region of an internal combustion engine, and an apparatus for implementing the method, which makes a metering possible, which is as exact as possible.

SUMMARY

The procedural approach according to the invention for operating a metering valve proceeds from an electromagnetically actuated valve, which is loaded with a pulse-width modulated metering signal, which defines the metering of a reagent or at least a precursor of a reagent, which is to be metered into the exhaust gas region of an internal combustion engine.

The procedural approach according to the invention distinguishes itself due to the fact that a clock signal is provided, whose cycle duration is smaller than the cycle duration of the pulse-width modulated metering signal, and that the cycle duration of the pulse-width modulated metering signal is set as a function of a metering request signal to multiples of the cycle durations of the clock signal.

A significant advantage of the procedural approach according to the invention lies therein, that it can rapidly react to a change in the metering request due to the fact that the cycle duration of the current cycle can be interrupted, and a new cycle duration can be defined. For this reason, said procedural approach does not have to wait until the current cycle duration of the metering signal has elapsed as is the case in the technical field (state of the art). Because a clock-synchronous signal processing is generally assumed, the reaction speed to a change in the metering request can be adapted by the amount of reduction of the cycle duration of the metering signal in comparison to the cycle duration of the pulse-width modulated metering signal. By means of the procedural approach according to the invention, it is, for example, possible in the case of a required sudden increase in the metering request, for example during driveaway of a motor vehicle with a high load, to immediately adapt the dosage.

Advantageous modifications and configurations of the procedural approach according to the invention result from the dependent claims.

Provision is made in an advantageous configuration for the pulse duration of the pulse-width modulated metering signal to be set to multiples of the cycle duration of the clock signal. A simple implementation of a signaling system thereby results.

Provision is made in an advantageous configuration for the opening duration of the metering valve to be limited to a minimum opening duration. Particularly a crystallizing of the reagent is thus avoided, which can clog a metering valve, particularly if the precursor of the reagent relates to a urea/water solution, respectively to a urea/formic acid/water solution.

The apparatus according to the invention for implementing the method initially relates to a control unit, which is specifically configured to implement the method. The control unit particularly contains wherewithal, which is suitably configured for implementing the method.

Provision is made in a configuration for the control unit to contain a clock generator to provide the clock signal as well as a metering signal stipulation for defining the cycle duration as well as the pulse duration of the pulse-width modulated metering signal.

The control unit preferably contains at least one electrical memory, in which the procedural steps are deposited as a computer program.

Provision is made in the control program according to the invention for all steps of the method according to the invention to be executed if said program is run in a control unit.

The control program product according to the invention with a program code stored on a machine-readable carrier executes the method according to the invention if the program is executed in a control unit.

Additional advantageous modifications and configurations of the procedural approach according to the invention result from further dependent claims. An example of embodiment of the invention is depicted in the drawing and is explained in detail in the following description.

BRIEF DESCRIPTION OF THE DRAWINGS

The following are shown.

DETAILED DESCRIPTION

Figure 1:
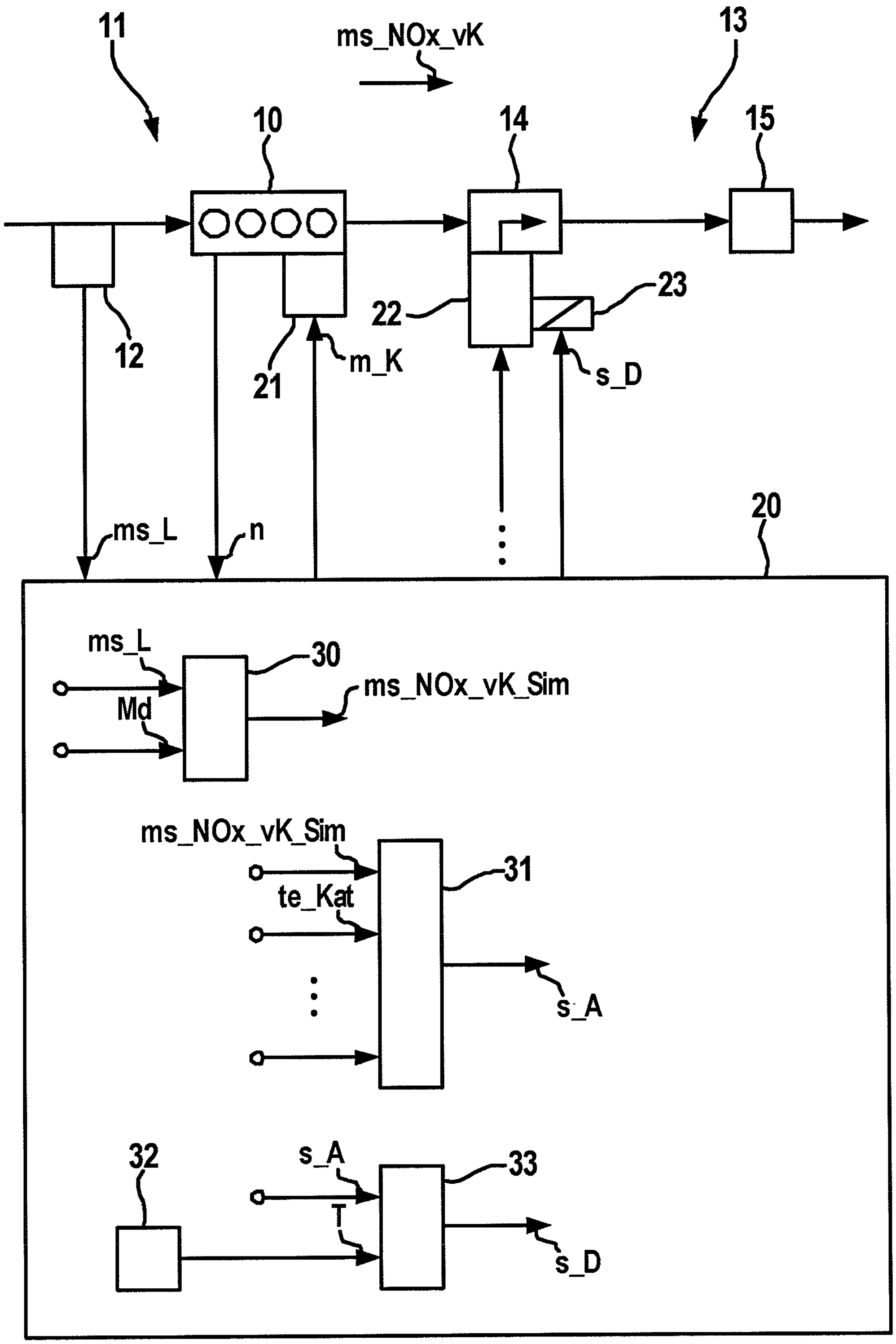
FIG. 1 is a technical environment, in which a method according to the invention is operating.

FIG. 1 shows an internal combustion engine 10, in whose air intake region 11, an air sensor 12 is disposed; and in whose exhaust gas region, a metering apparatus 14 as well as a catalytic converter 15 is disposed. A NOx mass flow ms_NOx_vK occurs upstream of the catalytic converter 15.

The air sensor 12 provides an air signal ms_L to a control unit 20, and the internal combustion engine 10 provides an engine rotational speed n to said control unit 20. The control unit 20 provides a fuel signal m_K to a fuel-metering device 21.

A metering valve 22, which is actuated by an electromagnet 23, is assigned to the metering apparatus 14. The electromagnet 23 is loaded with a pulse-width modulated metering signal s_D, which is provided by the control unit 20.

The control unit 20 contains a NOx mass flow ascertainment 30, to which the air signal ms_L as well as a measurement Md for the load of the internal combustion engine 10 is made available and which provides a calculated NOx mass flow ms_NOx_vK_Sim.

The control unit 20 further contains a metering request signal ascertainment 31, to which the calculated NOx mass flow ms_NOx_vK_Sim, the temperature te_Kat as well as additional input variables, which are not specified in detail, are made available and which provides a metering request signal s_A.

The control unit 20 further contains a clock generator 32, which provides a clock signal T to a metering signal stipulation 33. The metering signal stipulation 33 is further provided with the metering request signal s_A. The metering signal stipulation 33 provides the pulse-width modulated metering signal s_D.

During the operation of the internal combustion engine 10, a NOx mass flow ms_NOx_vK can occur in the exhaust gas region 13 particularly as a function of the measurement Md for the load of the internal combustion engine 10. Said NOx mass flow ms_NOx_vK may not exceed a specified measurement due to legal regulations. The integral of the NOx mass flow ms_NOx_vK, from which the NOx mass is obtained with regard to time or particularly with regard to a driving distance, is equivalent to a NOx mass flow ms_NOx_vK, provided the internal combustion engine 10 is employed in a motor vehicle as the driving engine.

The measurement Md for the load of the internal combustion engine 10 can, for example, be obtained from a position of an unspecified accelerator pedal. The measurement Md for the load of the internal combustion engine 10 is, for example, also reflected in the fuel signal m_K, which establishes at least a point of injection time for the fuel during a cycle of the internal combustion engine 10 as well as the quantity of the fuel-metering device 21 to be metered. The measurement Md for the load can furthermore be obtained alone or preferably additionally from the engine rotational speed n. In the example of embodiment shown, it is assumed that the NOx mass flow ascertainment 30 provides the calculated NOx mass flow ms_NOx_vK_Sim with the aid of the air signal ms_L provided by the air sensor 12 and the measurement Md for the load of the internal combustion engine 10.

The NOx contained in the exhaust gas is supposed to be converted as far as possible in the catalytic converter 15. In the example of embodiment shown, it is assumed that provision is made for a SCR catalytic converter to be the catalytic converter 15, which for the implementation of the NOx conversion requires the reagent, which is to be introduced into the exhaust gas region 13 with the metering apparatus 14, respectively the precursor of the reagent of the reagent effectively acting in the SCR catalytic converter 15.

A urea/water solution or a urea/formic acid/water solution can, for example, be used as the precursor of the reagent, which is sprayed directly into the exhaust gas region 13; and in so doing, ammonia is formed there by thermolysis, which the SCR catalytic converter 15 can use as the reagent.

The reagent can be directly sprayed from the metering valve 22 into the exhaust gas region 13. In this case, the metering apparatus 14 is, for example, identical to the metering valve 22 except for the mounting flange. Provision can alternatively be made for the metering apparatus 14 to contain a spray pipe and for the metering valve 22 not to be positioned directly at an exhaust gas duct or in its vicinity.

The metering valve 22 is actuated by an electromagnet 23. Provision can be made in a cost effective implementation of the metering valve 22 for a conventional gasoline injection valve, which is known, for example, from the technical field according to the German patent DE 37 10 467 C1 mentioned at the beginning of the application, to be used and if need be a modification of said injection valve. Said injection valve can be very inexpensively supplied due to its bulk production.

A simple implementation of the metering valve 22 makes provision for the electromagnet 23 in an energized state to attract an armature. Said armature is fixedly connected to a valve needle, which during the attraction of the armature unblocks one or several openings, out of which the reagent, which is pressurized at the reagent operating pressure p, is sprayed.

Besides the calculated NOx mass flow ms_NOx_vK_Sim, the metering request signal ascertainment 31 especially takes into account the temperature te_Kat of the SCR catalytic converter 15 as well as preferably unspecified influencing variables as, for example, the exhaust gas temperature and/or operating variables of the internal combustion engine 10.

Figure 2:
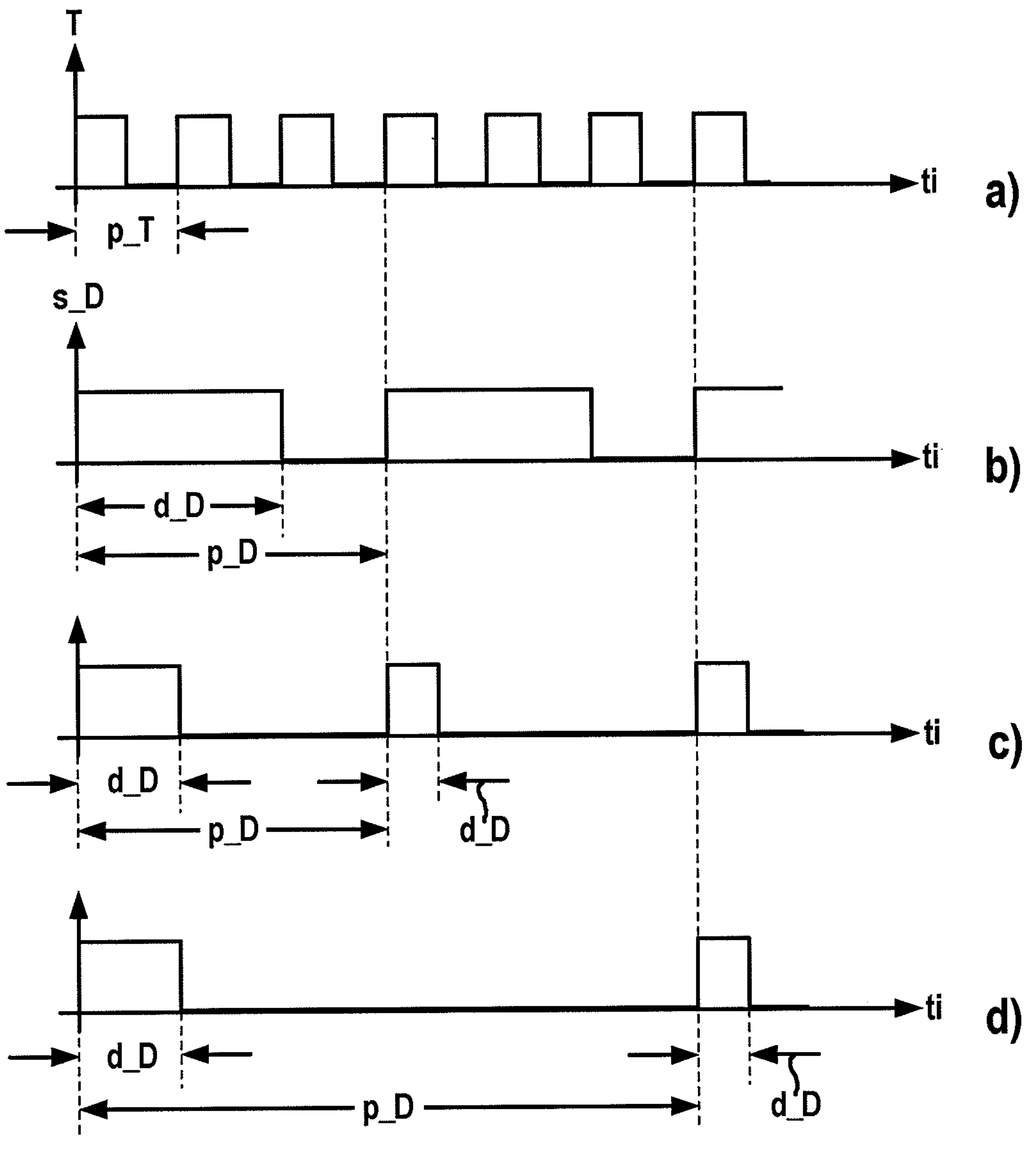
FIGS. 2*a* to 2*d* depict signal curves as a function of time.

In comparison to a conventional gasoline injection, the metering valve 22, which is preferably implemented as a gasoline injection valve or a modified gasoline injection valve, meters a considerably smaller amount of liquid in relationship to time, respectively the driving distance in the application at hand. While a gasoline injection assumes an amount of, for example, several liters per 100 km, a consumption of, for example, practically zero to two liters can be assumed for a dosage of the reagent. The pulse-width modulation of the pulse-width modulated metering signal, which is shown in detail in FIGS. 2*b*-2*d*, is supposed to be defined as the ratio of the pulse duration d_D to the cycle duration p_D. For this reason, said pulse-width modulation varies within a correspondingly large range.

FIG. 2*a* shows the clock signal T, which is provided by the clock generator 32 and has a cycle duration p_T, which is shorter than the cycle duration p_D of the pulse-width modulated meter signal s_D. The cycle duration p_D of the pulse-width modulated metering signal s_D is set to integer multiples of the cycle durations p_T of the clock signal T.

The metering signal stipulation 33 fixes the cycle duration p_D of the pulse-width modulated metering signal s_D as a function of the metering request signal s_A in order to set the required dosage of the reagent. By setting the cycle duration p_D of the metering signal s_D to integer multiples of the clock signal T, a simple implementation of a signaling system is on the one hand possible. On the other hand, when a change in the metering request signal s_A occurs, a comparatively quick reaction can take place by changing the cycle duration p_D of the metering signal s_D.

The amount of reagent to be metered can be broadly varied by the stipulation of the cycle duration p_D as well as by the stipulation of the pulse duration d_D of the pulse-width modulated metering signal s_D.

A metering signal s_D, which leads to a comparatively high dosage, is shown in FIG. 2*b*. In the example of embodiment shown, the cycle duration p_D of the pulse-width modulated metering signal s_D is set to a minimum factor, for which preferably provision has been made, of, for example, three cycle durations p_T of the clock signal T. The pulse duration d_D is set to two cycle durations p_T of the clock signal T, so that the pulse-width modulation of the metering signal s_D amounts to 66.6%.

FIG. 2*c* shows a transition to a lower dosage. The cycle duration p_D of the pulse-width modulated metering signal s_D is thereby initially still maintained. The pulse duration d_D was, however, reduced; and in so doing, the first pulse duration d_D is set equal to one cycle duration p_T of the clock signal T and the subsequent pulse duration d_D is set to half of the cycle duration p_T of the clock signal. By varying the pulse durations d_D, the pulse-width modulation can itself be adapted within wide ranges to the demands when the cycle duration p_D of the pulse-width modulated metering signal s_D remains unchanged.

FIG. 2*d* shows a transition to an even lower dosage, whereby the cycle duration p_D of the pulse-width modulated metering signal s_D was doubled in comparison to the ratios shown in FIGS. 2*b* and 2*c*, so that a cycle duration p_D corresponds to six cycle durations p_T of the clock signal T. In principle an increase in the cycle duration to a smaller value would be possible; and in so doing, the smallest value is set in such a way that the cycle duration p_D corresponds to four cycle durations p_T of the clock signal T.

It is assumed in the examples of embodiment shown, that the pulse durations d_D of the pulse-width modulated metering signal s_D correspond to a complete cycle duration p_T or to half of a cycle duration p_T of the clock signal T. By means of this configuration, the pulse duration d_D can be obtained with simple means of signal technology directly from the clock signal T.

It was determined using experiments that the reagent is no longer sprayed in a mist below a certain opening duration of the metering valve 22. Instead droplets form, which partially remain on the metering valve 22 or which move as an incomplete spray mist or especially as droplets into the exhaust gas region 13.

On the one hand, a loss of reagent occurs on account of the droplets being formed; and on the other hand, it was determined that, for example, a urea/water solution crystallizes. The crystallizing of the reagent affects the geometric ratios at the metering valve 22 and can worsen the capacity to develop a spray mist. In the extreme case, the crystallizing of the reagent can lead to a clogging of the metering valve 22.

Provision is therefore made according to a configuration for the limitation of the opening duration of the metering valve 22 to a minimum opening duration. The minimum opening duration is achieved by a corresponding stipulation of the pulse duration d_D of the pulse-width modulated metering signal, whereby the pulse duration d_D is preferably varied as a function of the current operating conditions of the metering valve 22. The minimum opening duration depends on the type of valve and/or on the conditions in the exhaust gas region 13 and is preferably experimentally ascertained.

The invention claimed is:

1. An apparatus comprising: at least one control unit, wherein the control unit implements a method of operating an electromagnetically actuated metering valve, the method comprising: loading the metering valve with a pulse-width modulated metering signal that stipulates a dosage of a precursor of a reagent introduced into an exhaust gas region of an internal combustion engine; forming ammonia by a thermolysis process of the precursor, the ammonia acting as the reagent; providing a clock signal having a clock signal period, wherein the clock signal period is smaller than a period of the pulse-width modulated metering signal; setting the period of the pulse-width modulated metering signal as a function of a metering request signal to a multiple of the clock signal period; and adjusting at least one of the period of the pulse-width modulated metering signal and a pulse duration of the pulse-width modulated metering signal in order to adapt the dosage of the reagent; calculating a minimum pulse duration based on a type of the metering valve and conditions in the exhaust gas region, the minimum pulse duration calculated to enable the metering valve to completely open, the minimum pulse duration further calculated so that a spray mist is produced during metering which prevents the reagent from crystallizing; limiting the pulse duration of the pulse-width modulated metering signal to a minimum pulse duration; and setting the pulse duration of the pulse-width modulated metering signal as a multiple of the clock signal period.

2. An apparatus according to claim 1, wherein the at least one control unit contains a clock generator for providing the clock signal; and wherein the at least one control unit stipulates the period and the pulse duration of the pulse-width modulated metering signal.

3. A computer-implemented method of operating an electromagnetically actuated metering valve, the computer-implemented method comprising the steps of: loading the metering valve with a pulse-width modulated metering signal that stipulates a dosage of a precursor of a reagent introduced into an exhaust gas region of an internal combustion engine; forming ammonia by a thermolysis process of the precursor, the ammonia acting as the reagent; providing a clock signal having a clock signal period, wherein the clock signal period is smaller than a period of the pulse-width modulated metering signal; setting the period of the pulse-width modulated metering signal as a function of a metering request signal to a multiple of the clock signal period; and adjusting at least one of the period of the pulse-width modulated metering signal and a pulse duration of the pulse-width modulated metering signal in order to adapt the dosage of the reagent; calculating a minimum pulse duration based on a type of the metering valve and conditions in the exhaust gas region, the minimum pulse duration calculated to enable the metering valve to completely open, the minimum pulse duration further calculated so that a spray mist is produced during metering which prevents the reagent from crystallizing; limiting the pulse duration of the pulse-width modulated metering signal to a minimum pulse duration; and setting the pulse duration of the pulse-width modulated metering signal as a multiple of the clock signal period.

4. A computer program product with computer-executable instructions stored thereon, the computer program product comprising a physically tangible computer-readable medium, the computer-executable instructions for operating an electromagnetically actuated metering valve, wherein the computer-executable instructions cause a control unit that executes the instructions to: load the metering valve with a pulse-width modulated metering signal that stipulates a dosage of a precursor of a reagent introduced into an exhaust gas region of an internal combustion engine; form ammonia by a thermolysis process of the precursor, the ammonia acting as the reagent; provide a clock signal having a clock signal period, wherein the clock signal period is smaller than a period of the pulse-width modulated metering signal; set the period of the pulse-width modulated metering signal as a function of a metering request signal to a multiple of the clock signal period; and adjust at least one of the period of the pulse-width modulated metering signal and a pulse duration of the pulse-width modulated metering signal in order to adapt the dosage of the reagent; calculate a minimum pulse duration based on a type of the metering valve and conditions in the exhaust gas region, the minimum pulse duration calculated to enable the metering valve to completely open, the minimum pulse duration further calculated so that a spray mist is produced during metering which prevents the reagent from crystallizing; limit the pulse duration of the pulse-width modulated metering signal to a minimum pulse duration; and set the pulse duration of the pulse-width modulated metering signal as a multiple of the clock signal period.

5. A method of operating an electromagnetically actuated metering valve, the method comprising:

loading the metering valve with a pulse-width modulated metering signal that stipulates a dosage of a precursor of a reagent introduced into an exhaust gas region of an internal combustion engine;

forming ammonia by a thermolysis process of the precursor, the ammonia acting as the reagent;

providing a clock signal having a clock signal period, wherein the clock signal period is smaller than a period of the pulse-width modulated metering signal;

setting the period of the pulse-width modulated metering signal as a function of a metering request signal to a multiple of the clock signal period;

adjusting at least one of the period of the pulse-width modulated metering signal and a pulse duration of the pulse-width modulated metering signal in order to adapt the dosage of the reagent;

calculating a minimum pulse duration based on a type of the metering valve and conditions in the exhaust gas region, the minimum pulse duration calculated to enable the metering valve to completely open, the minimum pulse duration further calculated so that a spray mist is produced during metering which prevents the reagent from crystallizing;

limiting the pulse duration of the pulse-width modulated metering signal to the minimum pulse duration; and setting the pulse duration of the pulse-width modulated metering signal as a multiple of the clock signal period.

6. A method according to claim 5, further comprising setting the pulse duration of the pulse-width modulated metering signal to a minimum of three periods of the clock signal.

* * * * *